Nov. 12, 1968   E. W. HENDERSON ET AL   3,410,660
CARBON BLACK REACTOR AND METHOD OF MAKING CARBON BLACK
Filed Sept. 10, 1965                                     3 Sheets-Sheet 1

INVENTORS
E. W. HENDERSON
J. C. KREJCI

Young and Quigg
ATTORNEYS

Fig. 2

INVENTORS
E. W. HENDERSON
J. C. KREJCI
BY
*Young and Quigg*
ATTORNEYS

Nov. 12, 1968   E. W. HENDERSON ETAL   3,410,660
CARBON BLACK REACTOR AND METHOD OF MAKING CARBON BLACK
Filed Sept. 10, 1965   3 Sheets-Sheet 3

INVENTORS
E. W. HENDERSON
BY   J. C. KREJCI

ATTORNEYS

United States Patent Office 3,410,660
Patented Nov. 12, 1968

3,410,660
CARBON BLACK REACTOR AND METHOD OF MAKING CARBON BLACK
Eulas W. Henderson, Borger, and Joseph C. Krejci, Phillips, Tex., assignors to Phillips Petroleum Company, a corporation of Delaware
Filed Sept. 10, 1965, Ser. No. 486,405
8 Claims. (Cl. 23—209.4)

ABSTRACT OF THE DISCLOSURE

Production of furnace carbon black having increased structure characteristics by introducing a hydrocarbon feedstock into a body of hot combustion gases in a carbon black furnace, the hot combustion gases being formed in a combustion zone of the furnace by burning a fuel gas with a first stream of air preheated by passing through an annular space between the outer wall of the reaction tube and the inner wall of the housing and a second stream of air introduced directly into the combustion zone. The feedstock is partially burned under carbon black producing conditions in the combustion gases and the carbon black product is recovered from the effluent from the furnace.

This invention relates to a carbon black reactor and a method of making carbon black. In one aspect this invention relates to an improved carbon black furnace. In another aspect this invention relates to a method of operating said furnace for the production of carbon black.

For several years carbon black has been produced in large quantities in furnaces. The larger part of the carbon black produced today is used as a reinforcing agent for rubber. By far the larger part of the compounded rubber material containing carbon black is designed specifically for tire treads or tire carcasses. The state of this rubber compounding art has advanced to such a degree that the properties of the carbon black used in such compounding must be controlled within narrow limits. Such a control of all of the desired properties of the carbon black is oftentimes difficult to achieve.

One of the most important properties of a carbon black when used in the compounding of rubber for use in tire manufacturing is commonly referred to as "structure." There is a good correlation between the structure of a carbon black and the modulus of a rubber product compounded with said carbon black. Other properties being comparable, high structure carbon blacks normally yield high modulus rubber and low structure carbon blacks normally yield low modulus rubber.

By the term "structure," as applied herein to carbon black, is meant characteristics of the carbon black particles which relate to flocculation of said particles. The structure is said to be high when there is a strong tendency for the particles to form chains of particles. Conversely, the structure is said to be low when there is little tendency to form such chains.

Since it is not convenient to measure the structure directly, the oil absorption of the black is commonly used as a "measure" of the structure. It has been found that the oil absorption of a carbon black correlates well with certain properties, such as modulus, of a rubber having the carbon black compounded therein. Measurement of oil absorption gives a quick reliable measure of the structure of the carbon black. It is thus possible to obtain a rapid measure of one of the most important properties of carbon black insofar as rubber compounds prepared with said carbon black are concerned.

Furnace carbon blacks having high structure characteristics have several advantages in the compounding of rubber. For example, they are "easy processing," i.e., are readily compounded into the rubber. Another advantage is that rubber compounded with high structure carbon blacks possesses superior extrusion properties. For many of the applications where high structure furnace blacks are preferred, it would be desirable to have carbon blacks of higher structure than can normally be produced by furnace processes.

The present invention provides a method and an apparatus for making a furnace carbon black product having increased structure characteristics.

An object of this invention is to provide valuable carbon blacks and methods of making the same. Another object of this invention is to provide a process for producing a furnace carbon black having an increased structure or oil absorption value. Another object of this invention is to controllably increase the structure or oil absorption value of a furnace carbon black produced by the decomposition of a hydrocarbon in a carbon black furnace. Another object of this invention is to provide a process for making a furnace carbon black, from a given hydrocarbon feedstock, having a higher structure or oil absorption value than would normally be produced from said hydrocarbon feedstock. Another object of this invention is to provide a process for regulating and controlling the properties of furnace carbon blacks so as to satisfy prescribed and predetermined requirements for the properties of said carbon blacks. Still another object of the invention is to provide an apparatus which can be employed to produce furnace carbon blacks having increased structure characteristics. Another object of the invention is to provide an improved carbon black furnace which can be operated so as to attain the above-described other objects of the invention. Still another object of the invention is to provide an improved carbon black furnace which is more economical to construct and maintain. Other aspects, objects, and advantages of the invention will be apparent to those skilled in the art in view of this disclosure.

Thus, according to the invention, there is provided a carbon black furnace, comprising: an elongated tubular housing having an upstream end and a downstream end; a closure member closing the upstream end of said housing; an elongated reaction tube having an upstream end and a downstream end, of smaller cross-sectional area than said housing, and concentrically mounted within said housing to provide an annular space between the outer wall of said reaction tube and the inner wall of said housing; an annular closure plate closing the downstream end of said annular space; said upstream end of said reaction tube being spaced apart longitudinally from said upstream end of said housing to provide a combustion chamber in the upstream end portion of said housing; a refractory lining disposed around and covering the inner wall of said reaction tube; a first air inlet means disposed in the downstream end portion of said housing and communicating with said annular space; a second air inlet means disposed in the upstream end portion of said housing and communicating with said combustion chamber; a gas burner means extending through said closure member into said combustion chamber in substantial axial alignment with said reaction tube; and a hydrocarbon inlet means concentrically mounted within said gas burner means.

Further according to the invention, there is provided a method for producing carbon black, which method comprises: preheating a first stream of air by passing same through an annular space in indirect heat exchange with and in a direction generally countercurrent to the flow of a reaction mixture being passed through a generally cylindrical reaction zone surrounded by said annular space; introducing said preheated air into a generally cylindrical combustion zone disposed upstream of and in open communication with said reaction zone; introducing a second stream of air tangentially into said combustion zone and into admixture with said first stream of air; introducing a stream of fuel gas into said combustion zone to establish a rotating mixture of fuel gas and air; igniting said mixture and passing the resulting rotating hot combustion gases into the upstream end of said reaction zone; introducing a hydrocarbon feedstock into the upstream end of said reaction zone; in said reaction zone, forming said reaction mixture by partially burning said feedstock under carbon black-producing conditions to produce said carbon black; and recovering said carbon black from the reaction mixture effluent from said reaction zone.

The furnace carbon blacks produced in accordance with the invention are characterized by higher than normal modulus properties in rubber, i.e., said carbon blacks impart modulus values to rubber which are higher than what would normally be expected from a furnace carbon black produced from the feedstock used. The feedstock may be one that in the absence of this invention usually yields a high modulus carbon black, or the feedstock may be one that usually yields a normal modulus carbon black. It is also within the scope of the invention to produce higher than normal modulus furnace blacks from feedstocks which usually yield what is generally considered a low modulus carbon black. In any event, the carbon black produced in the practice of the invention is characterized by a higher modulus in rubber than would be expected to be produced from the feedstock being used.

Thus, herein and in the claims, unless otherwise specified, the term "higher than normal modulus" when applied to a furnace carbon black, refers to a carbon black which when compounded in rubber imparts a modulus property to said rubber which is higher than would be expected for a carbon black produced from the particular feedstock being used.

We have also discovered that the linear velocity of the combustion air or other free oxygen-containing gas introduced into the upstream end of the combustion chamber of the reactor influences the structure characteristics or oil absorption values of the carbon black product obtained in the practice of the invention. We have also discovered that the linear velocity of the combustion gas introduced into said combustion chamber also influences the structure characteristics or oil absorption values of the carbon black product obtained in the practice of the invention. In general, other factors being substantially equal, an increase in the linear velocity of the air or other oxygen-containing stream, i.e., the linear velocity in the pipe of the tangential air inlet means, and an increase in the linear velocity of the fuel gas being passed to the burner in the combustion zone, i.e., nozzle velocity, causes a decrease in the amount of structure increase which is obtained in the carbon black product of this invention.

Figures 1, 6:
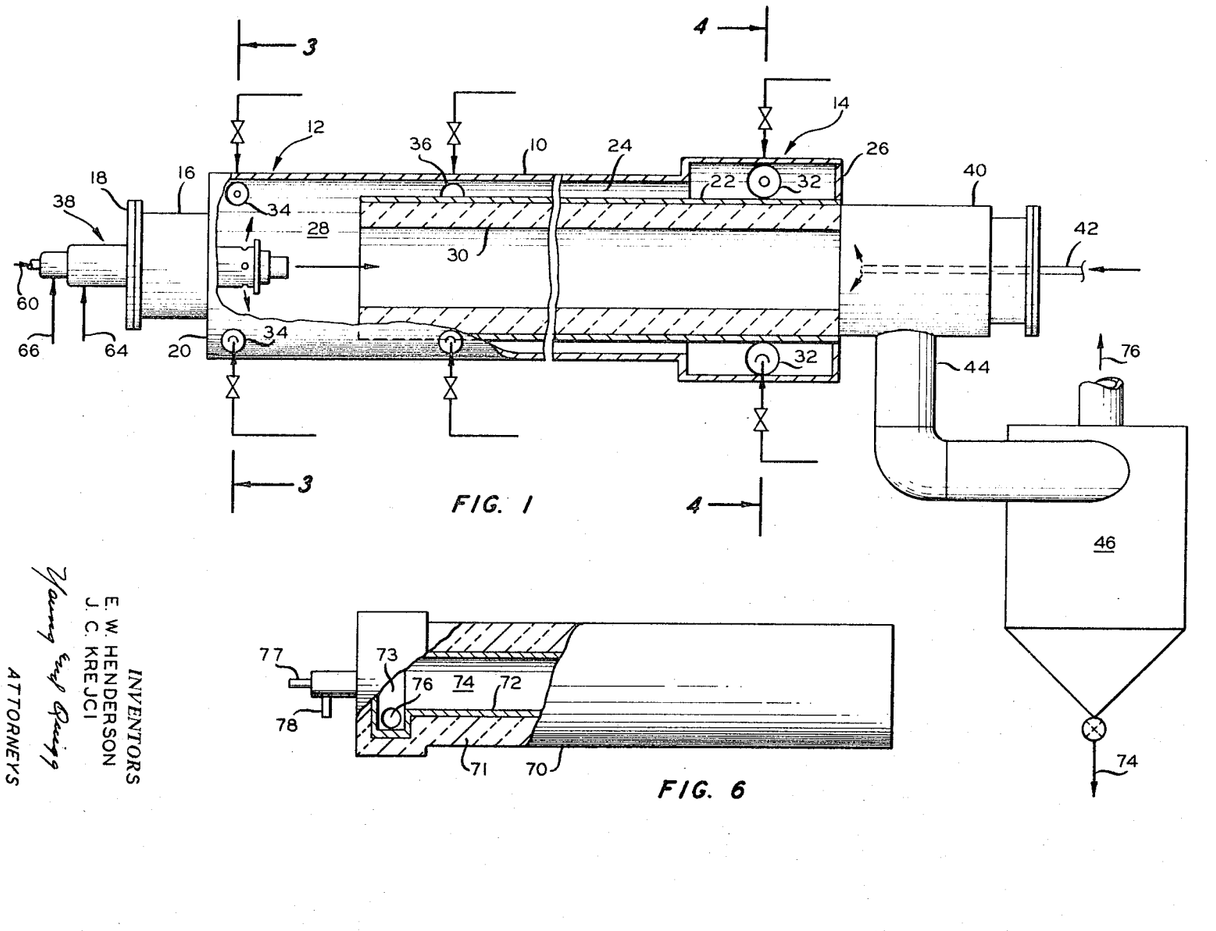
FIGURE 1 is an illustration, partly in cross-section, of a carbon black furnace fabricated in accordance with the invention, and other apparatus associated therewith which can be employed in the practice of the invention.
FIGURE 6 is a view, partly in cross-section, of a conventional carbon black reactor of the type employed in the control runs set forth in the examples hereinafter.

Referring now to the drawings, wherein like reference numerals are employed to denote like elements of apparatus, the invention will be more fully explained. In FIGURE 1, there is illustrated one embodiment of a carbon black furnace fabricated in accordance with the invention. Said furnace comprises an elongated generally cylindrical housing 10 having an upstream end portion 12 and a downstream end portion 14. It will be noted that said downstream end portion is of larger diameter than said upstream end portion. Said downstream end portion 14 will generally comprise from about 0.1 to about 0.4 of the total length of said housing 10. A generally cylindrical sleeve 16, of smaller diameter than said housing, is attached to the upstream end 20 of said housing 10. A closure member 18 is provided for closing the upstream end of said sleeve 16. Although not shown in the drawing, it will be understood to be within the scope of the invention to omit said sleeve 16 and install closure member 18 directly onto the upstream end 20 of said housing 10. An elongated generally cylindrical reaction tube 22, of smaller diameter than said upstream end portion 12 of said housing 10, is concentrically mounted within said housing to provide an annular space 24 between the outer wall of said reaction tube 22 and the inner wall of said housing 10. An annular closure plate 26, secured in any suitable manner, as by welding, to the downstream end of said housing 10 and the downstream end of the metal shell of reactor tube 22, is provided for closing the downstream end of said annular space 24.

The upstream end of said reaction tube 22 is spaced apart longitudinally from said upstream end 20 of said housing 10 to provide a generally cylindrical combustion chamber 28 adjacent said upstream end of said housing. Said combustion chamber 28 will usually comprise from about 0.15 to about 0.35 of the total length of said housing 10. A refractory lining 30 is disposed on and covers the inner wall of said reaction tube 22. In one embodiment of the invention said refractory lining is preferably fabricated of a material having a relatively high heat transfer coefficient, silicon carbide for example. Said liner 30 can be fabricated as a precast sleeve and cemented in place or can be molded or cast in place employing conventional castable refractory material. It is preferred that said refractory liner be of the minimum thickness capable of protecting reactor tube 22 for an extended period of time. Said minimum thickness is desirable in order to obtain maximum heat transfer for heat exchange with the air or other free oxygen-containing gas flowing through said annular space 24, as described hereinafter, commensurate with the desirability of protecting the inner wall of the refractory tube 24 from the high temperatures therein.

Figure 3:
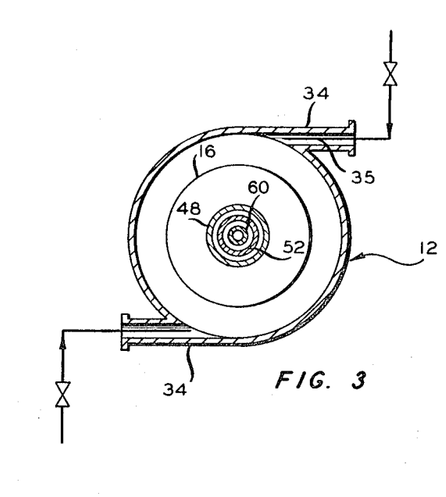
FIGURE 3 is a cross-section taken along the lines 3—3 of FIGURE 1.
Figure 4:
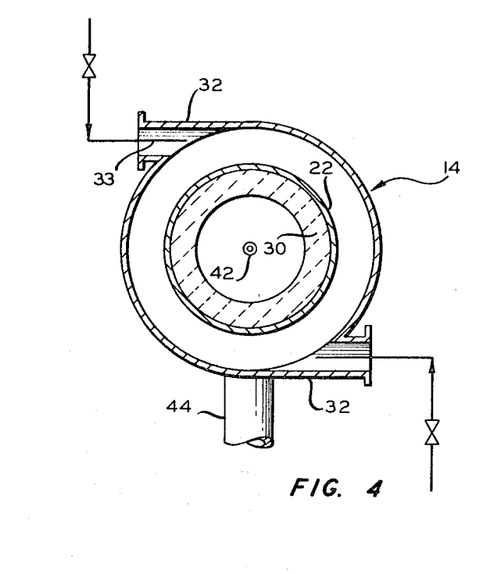
FIGURE 4 is a cross-section taken along the lines 4—4 of FIGURE 1.

A first pair of tangential air inlet tubes 32 is disposed in said downstream end portion 14 of said housing 10 and communicates with said annular space 24. A second pair of tangential air inlet tubes 34 is disposed in said upstream end portion 12 and adjacent said upstream end 20 of said housing 10 and communicates with said combustion chamber 28. Although said first tangential air inlet tubes 32 and said second tangential air inlet tubes 34 have been illustrated as being employed in pairs, it is within the scope of the invention to employ a single tangential air inlet tube 32 and a single tangential air inlet tube 34 in the respective positions shown. If desired, at least one other pair of tangential air inlet tubes 36, or a single tube, also communicating with said annular space 24, can be disposed in said housing 10 between said first and second air inlet tubes 32 and 34. All of said air inlet tubes can be provided with suitable flow control or regulating means, e.g., the valves shown in the conduits connected thereto. Said other tangential air inlet tubes, e.g., inlets 36, along with inlets 32, can be employed to control the amount of air preheat and the cooling of reactor tube 22. If desired, the velocity of the air streams introduced via said air inlet tubes 32, 34, and 36 can be controlled by installing internal pipes 33 and 35 of various diameters in said tubes 32, 34, and 36 as shown schematically in FIGURES 3 and 4, and as discussed further hereinafter in connection with Example I.

We have found that the introduction of from 25 to 67 volume percent of the combustion air through the tangential air inlets 34, and from 75 to 33 volume percent of said air through tangential air inlets 32, is necessary for good operation of the furnace. Best results are obtained when said air introduced through said inlets 34 is from 45 to 55 volume percent of the total. The furnace is substantially inoperable when no air is introduced through said inlets 34.

A gas burner and feed hydrocarbon inlet means 38 extends axially through said closure member 18 into said combustion chamber 28 in substantial axial alignment with said reaction tube 22.

Although not forming any part of the instant invention, there is shown attached to the downstream end of the furnace a quench section 40, which can be of the same, or larger, inner diameter as the inner diameter of reactor tube 22. Generally, the inner wall of said quench section is lined with a refractory material similarly as in reactor tube 22. Extending into the downstream end of said quench section 40 is a quenching means 42 for introducing a quenching liquid, usually water in liquid phase, into said quench section so as to quickly quench the reaction mixture gases to a temperature below that at which carbon black formation takes place, preferably to a temperature lower than 2000° F. Said quench inlet means 42 can comprise any suitable tube arrangement having a spray on the inner end thereof and is usually adapted to be adjustable in longitudinal position within said quench section. Any other suitable means can be employed for introducing the quench liquid into said quench section 40. For example, said quench section 40 can be provided with a plurality of spray ports extending radially through the housing thereof into the interior of the quench section. A transfer conduit 44 is attached to said quench section 40 for transferring the quenched reaction mixture gases containing carbon black in suspension to carbon black separation means 46 which can comprise any suitable means for separating a suspension of solids from a gas. Carbon black separation means commonly employed in the industry usually comprise a plurality of cyclone separators and bag filter means.

Figure 2:
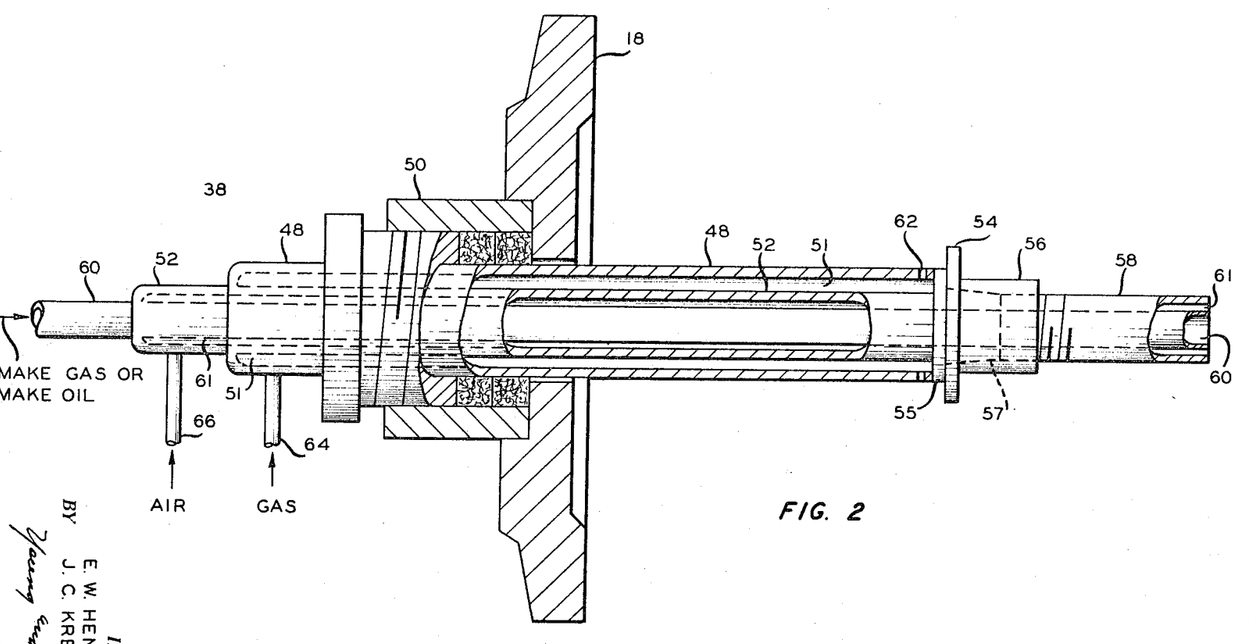
FIGURE 2 is an illustration, partly in cross-section, illustrating in greater detail the burner and hydrocarbon injection assembly shown in the carbon black reactor of FIGURE 1.

Referring now to FIGURE 2, there is shown in further detail the burner and hydrocarbon inlet assembly 38 of FIGURE 1. Said assembly comprises a tube 48 extending through closure member 18 substantially axially and rigidly attached thereto by means of packing gland assembly 50 by means of which the position of the inner end of said assembly within combustion chamber 28 can be varied. A second tube 52 is mounted concentrically within said first tube 48. An annular plate 55 is attached (as by welding) to the downstream end of said second tube 52 and serves as a closure member for the annular space 51 formed between said first tube 48 and said second tube 52. A first collar 57 (shown in dotted lines) is attached to the downstream face of said plate 55 and surrounds said second tube 52. A flame holder assembly comprising a vertically disposed disk or circular plate 54 having a circular opening therein, and a collar 56, attached to the downstream face of said disk 54, is threaded or otherwise secured onto said first collar 57. A burner tip 58, comprising what in effect is an extension of said second tube 52, is threaded into the downstream end of said collar 56. The purpose of said flame holder disk 54 is to stabilize the flame in combustion chamber 28 and prevent blowout of said flame under operating conditions. The above structure provides convenient means for readily changing either said flame holder 54 or said burner tip 58.

A third tube 60 for introduction of hydrocarbon feedstock is concentrically mounted within said second tube 52 and, as shown in FIGURE 2, extends through said disk and collar assembly 54–56 and through said burner tip 58. When said hydrocarbon feedstock is introduced in gas or vapor form, the downstream end of tube 60 will be open as shown in said FIGURE 2. When it is desired to introduce said feedstock in liquid or in only partially vaporized state, the end of tube 60 can be fitted with a suitable spray nozzle. A plurality, e.g., two to six, of radially disposed openings 62 is disposed in said first tube 48 substantially immediately upstream from said disk 54. Said openings 62 communicate with the annular space 51 formed between said first tube 48 and said second tube 52 and serve as outlets for combustion gas supplied to said annular space by means of conduit 64. The velocity of said combustion gas can be varied by varying the size and/or number of said openings 62. A small stream of air, commonly called jacket air, is introduced via conduit 66 into annular space 61. The primary function of said jacket air is to prevent the formation of coke around the outlet of burner tip 58.

Figure 5:
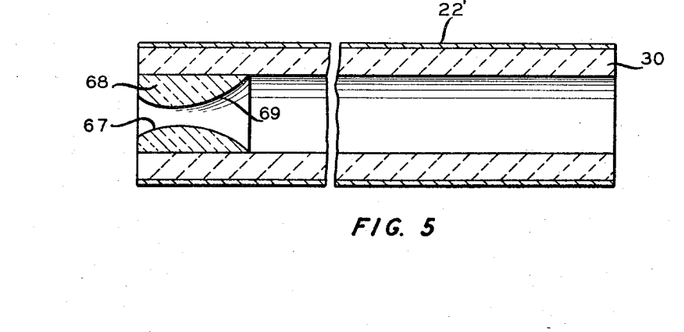
FIGURE 5 is an illustration in cross-section showing a modified reactor tube which can be employed in the carbon black furnace of FIGURE 1.

Referring now to FIGURE 5, there is shown a modified form of reactor tube 22, designated as 22' in FIGURE 5, which can be employed in another embodiment of the invention. In this embodiment of the invention combustion chamber 28 discharges into reactor tube 22' through a restricted Venturi choke 68. In a presently preferred form said Venturi coke 68 is formed in a ceramic cylinder having a rounded converging entrance 67 and a sloping diverging outlet 69. Combustion chamber 28, said choke 68, and the interior of reactor tube 22' are axially aligned and in open communication with each other.

Beneficial results in the practice of the invention are obtained with a throat diameter of said Venturi choke within the range of 20 to 80 percent of, and a length of from one to three times the inner diameter of said reactor tube 22'. Even more beneficial results are obtained when said Venturi choke has a throat diameter within the range of from 20 to 50 percent of, and a length of from 1.5 to 3 times the diameter of said reactor tube 22'. While a Venturi choke having the general configuration shown in FIGURE 5 is preferred, chokes of other shapes can be employed in the practice of the invention.

Referring now to FIGURE 6, there is illustrated in diagrammatic form the general construction and the general shape of a conventional carbon black furnace which was employed in making the control run in the examples hereinafter. In said FIGURE 6, reference numeral 70 identifies a steel shell within which is disposed insulation material 71. Said insulation material 71 is held in place by a refractory liner 72 which forms a combustion zone 73 and a reaction zone 74. Reference numeral 76 indicates the end of a burner tube or opening through the wall of combustion zone 73 for the introduction of a mixture of fuel gas and air for heating the furnace. The axis of said tube 76 is so disposed that the outlet of the tube is substantially tangential to the inner cylindrical wall of combustion zone 73 so that when the incoming combustion mixture is introduced at a high velocity the flame and combustion products enter said combustion zone tangentially. The combustion gases then follow a spiral path while passing through said combustion zone. When said gases reach the approximate center of said combustion zone, they enter the long reaction zone 74 and follow a helical pattern therethrough. Oil feed or charge stock in vaporized, partially vaporized, or liquid state is introduced into said combustion zone 73 through a feed pipe 77. Surrounding said feed pipe 77 is a jacket which is connected to a conduit 78 for supplying air for the purpose of preventing carbon deposition on the end of oil pipe 77 within said combustion zone. The furnace of FIGURE 6 has the general conformity and is constructed in the manner fully described in U.S. Patent 2,564,700. In the examples given hereinafter, in the run wherein a furnace of this type was employed the reaction chamber 74 was 3 inches in internal diameter and 25 inches long. The combustion chamber 73 was 4 inches long and 11 inches in diameter. In furnaces of this type such dimensions are merely exemplary and any and all dimensions may be varied as desired. In modifying a furnace of such design, however, it is necessary to make certain that the combustion chamber has a relatively large diameter in comparison to its length, while the reverse is true for the reaction zone.

In the operation of the apparatus of FIGURE 1, a first stream of air or other free oxygen-containing gas is introduced through tangential ports 32 and passed through annular space 24 in indirect heat exchange with and in a direction generally countercurrent to the flow of a reaction mixture (formed as described hereafter) being passed through reactor tube 22. Said preheated air is introduced into combustion chamber 28 and there mixed with a second stream of air introduced via tangential air inlets 34. Said second stream of air imparts a further swirl or helical movement to the air in combustion chamber 28. A stream of fuel gas is introduced into said combustion zone 28 via conduit 64, annular space 51, and radial ports 62 to establish a rotating mixture of fuel gas and air. Said mixture is ignited and the resulting mixture comprising rotating hot combustion gases is introduced into the upstream end of said reactor tube 22. A hydrocarbon feedstock, such as a vaporized normally liquid oil, is introduced via conduit 60 and passed into the upstream end of said reactor 22 along with said mixture comprising hot combustion gases. In said reaction zone, carbon black is produced by the partial burning or pyrolytic decomposition of said hydrocarbon feedstock under carbon black-producing conditions to form the above-referred-to reaction mixture which comprises a smoke, or suspension, of carbon black in the reaction gases. Said reaction mixture is passed into quench section 40 and there quenched in known manner. The quenched effluent is then passed via conduit 44 into separation means 46 from which carbon black product is removed via conduit 74 and tail gases are removed via conduit 76.

When a reactor tube 22', such as illustrated in FIGURE 5, is employed in the furnace of FIGURE 1 beneficial results are obtained. As set forth in the examples given hereinafter, a carbon black product having improved abrasion resistance and hysteresis properties is obtained.

The following examples will serve to further illustrate the invention. The charge oils used in said examples were conventional commercial aromatic concentrate carbon black-producing feedstocks prepared by the liquid sulfur dioxide extraction of cycle oils obtained in the catalytic cracking of gas oils. Said oils had the properties set forth in Table I below.

EXAMPLE I

A series of runs (Runs 1–6, inclusive) was carried out in a pilot plant-size reactor essentially like that illustrated in FIGURE 1. In the reactor employed in these runs combustion chamber 28 had an over-all length, i.e., from the upstream end 20 of housing 10 to the upstream or inlet end of reactor 22, of 10 inches. Reactor tube 22 had an effective or internal diameter of 3 inches and was 30 inches in length. Tangential air inlet ports 32 were 2 inches in diameter and tangential air inlet ports 34 were about 1 inch in diameter. In all of said Runs 1–6 the air introduced via ports 32 was introduced through ½ inch schedule 80 pipe suitably mounted within said ports 32 and terminating substantially tangential to the inner circumference of shell 14 as shown schematically in FIGURE 4. In Runs 5 and 6 the air introduced via ports 34 was introduced through ⅜ inch schedule 40 pipe suitably mounted within said ports 34 and terminating substantially tangential to the inner circumference of shell 12 as shown schematically in FIGURE 3. No internal pipes were employed in ports 34 in Runs 1, 2, 3, and 4. From the above description of fuel gas and make hydrocarbon inlet assembly 38, it will be understood that the effective length of said combustion chamber 28 can be varied by changing the distance from the end of tube 60 to the inlet of reactor tube 22. The inner diameter of combustion chamber 28 was approximately 7.5 inches. The other dimensions of the furnace were in proportion to those set forth above.

For comparison with a furnace carbon black made in a conventional furnace, the carbon blacks produced in said Runs 1–6 are compared with the carbon black produced in Run 7 in a conventional carbon black furnace essentially like that illustrated in FIGURE 6. In this furnace the reaction chamber 74 was 3 inches in internal diameter and 25 inches in length. The combustion chamber 73 was 11 inches in diameter and 4 inches long. This furnace had the general conformity and was constructed generally in the manner fully described in U.S. Patent 2,564,700. The operation of furnaces of this type is described in detail in said patent.

Operating conditions and tests on the carbon black products produced in said test runs are set forth in Table II below.

Samples of said carbon black products were compounded with SBR 1006 rubber in accordance with standard compounding procedures to produce a series of rubber compositions. The compounding recipe employed in preparing said rubber compositions was as follows:

TABLE I.—PROPERTIES OF FEEDSTOCKS

| Oil Number | A | B | C |
| --- | --- | --- | --- |
| API Gravity | 10.8 | 9.4 | 8.4 |
| ASTM Vacuum Distillation, ° F. at 760 mm.: | | | |
| 2% | 460 | 569 | 579 |
| 5% | 540 | 599 | 609 |
| 10% | 573 | 630 | 632 |
| 20% | 599 | 653 | 655 |
| 30% | 620 | 672 | 674 |
| 40% | 637 | 688 | 685 |
| 50% | 654 | 708 | 705 |
| 60% | 673 | 726 | 724 |
| 70% | 702 | 757 | 751 |
| 80% | 742 | 794 | 794 |
| 90% | [1] 772 | 865 | 869 |
| 95% | | 957 | 951 |
| Bureau of Mines Correlation Index | 90.5 | 94.0 | 97.5 |
| Viscosity: | | | |
| SUS at 100° F | 85.3 | 95.4 | 85.1 |
| SUS at 210° F | 36.0 | 36.9 | 35.6 |
| Carbon, Wt. percent | 89.2 | 88.9 | 88.9 |
| Hydrogen, Wt. percent | 9.5 | 9.3 | 9.4 |
| Sulfur, Wt. percent | 1.56 | 1.47 | 1.39 |
| Ramsbottom Carbon Residue, Wt. percent | 1.7 | 1.58 | 1.11 |
| BS&W, Vol. percent | 0.2 | 0.4 | 0.1 |
| Pentane Insoluble, Wt. percent | 0.2 | 0.38 | 0.19 |
| Pour Point, ° F | 40 | 55 | 45 |
| Ash, Wt. percent | | 0.015 | 0.002 |

[1] 86%.

| | Parts by wt. |
| --- | --- |
| SBR 1006 rubber | 100 |
| Carbon black | 40 |
| Zinc oxide | 3 |
| CP 250 [1] | 6 |
| Sulfur | 1.75 |
| Santocure [2] | 1.0 |

[1] A rubber softener—a refined BRT #7 having a specific viscosity of 6.5 to 8.5 at 100° C. BRT #7 is a refined tar with a high free carbon content, having a specific gravity of 1.20 to 1.25, and available from Allied Chemical and Dye Corporation.
[2] N-cyclohexyl-2-benzothiazyl-sulfonamide.

Said rubber compositions were each cured to a finished rubber by curing at 307° F. for 30 minutes. The resulting cured rubber compositions were tested in accordance with standard rubber testing procedures. Tests on said cured rubber compositions are set forth in Table II below.

TABLE II

| | Run Number | | | | | | |
|---|---|---|---|---|---|---|---|
| | 1 | 2 | 3 | 4 | 5 | 6 | 7 |
| Oil Charge: | | | | | | | |
|   Identification | B | B | C | C | B | C | A |
|   BMCI | 94.0 | 94.0 | 97.5 | 97.5 | 94.0 | 97.5 | 90.5 |
| Furnace Conditions: | | | | | | | |
|   Oil feed, gal./hr | 5.69 | 6.53 | 5.53 | 5.74 | 5.31 | 5.55 | 6.15 |
|   Oil preheat, °F | 805 | 805 | 815 | 810 | 800 | 800 | 550 |
|   Oil tube position, inches [1] | 2.5 | 4.0 | 3.0 | 2.5 | −3 | 3.0 | |
|   Tang. air—ports 32, M c.f.h | 3.0 | 3.0 | 3.0 | 3.0 | 3.0 | 3.0 | [2] 6.0 |
|   Tang. air—ports 34, M c.f.h | 3.0 | 3.0 | 3.0 | 3.0 | 3.0 | 3.0 | |
|   Tang. air velocity [5]—ports 32, ft./sec | 515 | 515 | 515 | 515 | 515 | 515 | |
|   Tang. air velocity [5]—ports 34, ft./sec | 135 | 135 | 135 | 135 | 615 | 615 | |
|   Jacket air, M c.f.h | 0.2 | 0.2 | 0.2 | 0.2 | 0.2 | 0.2 | 0.2 |
|   Fuel gas, M c.f.h | 0.4 | 0.4 | 0.4 | 0.4 | 0.4 | 0.4 | [3] 0.4 |
|   Fuel gas, velocity,[5] ft./sec | 500 | 500 | 500 | 500 | 1,000 | 750 | |
| Carbon Black Product: | | | | | | | |
|   Yield, lb./gal | 2.83 | 3.12 | 2.98 | 3.03 | | 2.83 | 2.64 |
|   Photelometer | 90 | 88 | 90 | 92 | 86 | 89 | 92 |
|   $N_2$ Surface area, sq. m./g | 160.0 | 158.7 | 154.7 | 153.5 | 142.7 | 157.2 | 151.5 |
|   Oil absorption, cc./g | 1.67 | 1.68 | 1.69 | 1.72 | 1.68 | 1.58 | 1.44 |
| Evaluation of Carbon Black in SBR 1006 Rubber: | | | | | | | |
|   300% modulus, p.s.i | 1,820 | 1,920 | 1,890 | 1,910 | 1,910 | 1,800 | 1,630 |
|   Tensile, p.s.i | [4] 3,450 | 3,910 | [4] 3,950 | 3,940 | [4] 3,650 | 3,740 | 3,990 |
|   Elongation, percent | [4] 450 | 480 | [4] 480 | 485 | [4] 460 | 475 | 490 |
|   Crosslinking, $\nu \times 10^4$, mols/cc | 1.98 | 1.96 | 2.01 | 1.98 | 1.96 | 1.98 | 1.89 |

[1] Distance upstream from inlet of reactor tube, a minus (−) value means the oil tube was inside the inlet of said reactor tube.
[2] Total tangential air.
[3] Tangential gas.
[4] Estimated.
[5] Approximate.

Referring to the above Table II, and comparing Runs 1–6, inclusive, made in accordance with the invention, with Run 7, made in a conventional carbon black furnace, shows that the oil absorption of all the carbon blacks produced in accordance with the invention was higher than the oil absorption of the carbon black produced in Run 7, made in accordance with the prior art. The same is true with respect to the modulus values of said carbon black products when compounded in rubber. Thus, it is clear that the invention provides an apparatus and a method for producing a furnace carbon black having increased structure characteristics.

Comparing Runs 1, 3, and 2 wherein the distance of the oil tube outlet from the inlet to the reactor tube was 2.5, 3.0, and 4.0 inches, respectively, with Run 5 wherein the oil tube outlet was positioned 3 inches inside the inlet of the reactor tube, shows that the position of the oil tube outlet had only a small, if any, effect upon the oil absorption values. However, in Run 5 the nitrogen surface area was decreased.

Comparing Runs 3 and 6 shows that increasing the velocity of the tangential air introduced through ports 34 from 135 feet per second in Run 3 to 615 feet per second in Run 6, and also increasing the fuel gas velocity from 500 feet per second in Run 3 to 750 feet per second in Run 6, decreases the oil absorption and modulus values of the carbon black produced. Thus, the provision of the ports 34 in the upstream end of the carbon black furnace and the variation of the velocity of the air introduced therethrough makes it possible to control the amount of increased structure characteristics obtained in the practice of the invention.

EXAMPLE II

In another run the furnace of FIGURE 1, equipped with a reactor tube 22′ fitted with a Venturi choke as illustrated in FIGURE 5, is operated under essentially the same conditions as Run 6 in Example I.

When using said reactor tube 22′ the yield of carbon black is 2.83 pounds per gallon of feedstock charge. When this carbon back is tested it is found to have a surface area of 157 square meters per gram and an oil absorption of 1.58 cc. per gram. When this carbon black product is tested in SBR 1006 rubber, it is found that the heat buildup is 64° F. whereas the carbon black product of Run 6 in Example I, made under comparable conditions, gave a heat buildup of 68° F. The resilience of the rubber using the carbon black product of this Example II is 64 percent whereas the resilience of the corresponding product from Run 6 in Example I is 60 percent.

From the above rubber data, it is seen that the hysteresis properties of a carbon black made in a furnace having a reactor tube fitted with a converging-diverging choke are much improved over those made in a furnace wherein the reactor tube is not fitted with such a choke. The lower heat buildup value is a very important advantage for carbon blacks used in compounding rubber to be used in manufacturing modern high performance tires.

The above-described aromatic concentrate oil of Table I represents one presently preferred type of feedstock for use in the practice of the invention. However, conventional aromatic oils used in the production of furnace carbon blacks can include oils other than extract oils produced by liquid sulfur dioxide extraction of cycle oils. Typical properties of conventional aromatic oils are: boiling range, 400 to 1200° F. and higher; BMCI, 75 to 140; and an API gravity of from about 0 to about 20°.

The invention is not to be limited to the use of such aromatic concentrate oils. Other oils, such as kerosene, gasoline boiling range hydrocarbons, heavy or light naphthas or oils even heavier than recycle gas oils can be used. Such hydrocarbon materials as natural gas, either dry gas, wet or raw natural gas as it comes from a gas well, or gasoline extraction plant or refinery residue gas can also be used. Further, hydrocarbons heavier than said gases can be used as charge, such as butane, pentane or the like. Broadly, most any hydrocarbon can be used as feedstock or make hydrocarbon in our process. The feedstock can be injected as a liquid through a spray or atomizer, although in many instances it is preferred to operate with the feedstock injected as a vapor. Hydrocarbons from other sources than petroleum likewise are suitable, as for example, low temperature coal gas, coal tar distillates, shale gases and distillates can be used. These feedstocks may contain most any class of hydrocarbon compound, as for example, saturated or unsaturated hydrocarbons, paraffins, olefins, aromatics, naphthenes or any others which might become available.

The BMCI correlation index referred to is a correlation index developed by the U.S. Bureau of Mines and is employed to denote aromaticity of an oil; a higher numerical index denoting a more aromatic oil. The index is calculated from the formula $$C.I. = \frac{48640}{K} + 473.7G - 456.8$$

where:

C.I.=Bureau of Mines correlation index
K=Average boiling point (° K.)
G=Specific gravity @ 60° F./60° F.

Oil absorption is measured by adding oil a few drops at a time to a one gram sample of carbon black on a mixing stone or glass plate. After each addition the oil is incorporated thoroughly with a spatula, using moderate pressure. Tiny pellets are formed, gradually increasing in size as more oil is added. The end point, approached one drop of oil at a time, is reached when a single ball of stiff paste is formed. The results are reported as cc. oil per gram of black, or converted to gallons of oil per 100 pounds of black.

The photelometer test is a measure of the tar content and thus a measure of the quality of the carbon black product. The tar content of carbon black is determined by mixing 2 grams of black with 50 cc. of chloroform, boiling the mixture, filtering, and determining the percentage light transmittance of the filtrate as compared with the transmittance of a blank sample of chloroform. The comparison is preferably conducted with a photoelectric colorimeter such as a Lumetron colorimeter at a wave length of 440 mu, a light intensity of 20, and a cell 1 cm. long. A tar-free black is arbitrarily defined as one that shows in tests on samples taken after pelleting a transmittance greater than 85 percent according to this procedure. Pelleting the flocculent black (not disclosed) by the conventional processes raises the photelometer number 5 points, or more, from 80 to 85 for example. Acetone is sometimes substituted for chloroform in the test procedure. The percent transmittance equivalent to 85% with chloroform is about 92% with acetone. The original acetone or chloroform used for the test should be substantially colorless. When the term "photelometer" is used without naming the solvent, the convention in the art is that chloroform is the solvent employed.

In the above tables the term "300 percent modulus, p.s.i." refers to the pounds per square inch pull in a tension test when the test piece of vulcanized rubber has been stretched 300 percent of the length of the original test piece. The term "tensile p.s.i." represents the pounds per square inch pull at the point of rupture or break of the test piece undergoing the above-mentioned 300 percent modulus test. The term "elongation" represents the stretch or elongation at the point of break. All of said tests are determined in accordance with ASTM D412–51T, and are carried out at 80° F. unless otherwise designated.

"Cross-linking" is determined from the reciprocal volume swell and equilibrium modulus as described by P. J. Flory, J. Rehner, Jr., "Journal of Chemical Physics," 11, 521 (1943) and P. J. Flory, ibid., 18, 108 (1950).

While certain embodiments of the invention have been described for illustrative purposes, the invention obviously is not limited thereto. Various other modifications will be apparent to those skilled in the art in view of this disclosure. Such modifications are within the spirit and scope of the invention.

We claim:

1. A carbon black furnace, comprising: an elongated tubular housing having an upstream end and a downstream end; a closure member closing the upstream end of said housing; an elongated reaction tube having an upstream end and a downstream end, of smaller cross-sectional area than said housing, and concentrically mounted within said housing to provide an annular space between the outer wall of said reaction tube and the inner wall of said housing; an annular closure plate closing the downstream end of said annular space; said upstream end of said reaction tube being spaced apart longitudinally from said upstream end of said housing to provide a combustion chamber in the upstream end portion of said housing; a refractory lining disposed around and covering the inner wall of said reaction tube; a first air inlet means disposed in the downstream end portion of said housing and communicating with said annular space for introducing a first stream of air into said annular space; a second air inlet means disposed in the upstream end portion of said housing and communicating with said combustion chamber for introducing a second stream of air into said combustion chamber; a gas burner means extending through said closure member into said combustion chamber in substantial axial alignment with said reaction tube; and a hydrocarbon inlet means concentrically mounted within said gas burner means.

2. A carbon black furnace, comprising: an elongated generally cylindrical housing having an upstream end and a downstream end; a closure member closing the upstream end of said housing; an elongated generally cylindrical reaction tube having an upstream end and a downstream end, of smaller diameter than said housing, and concentrically mounted within said housing to provide an annular space between the outer wall of said reaction tube and the inner wall of said housing; an annular closure plate closing the downstream end of said annular space; said upstream end of said reaction tube being spaced apart longitudinally from said upstream end of said housing to provide a combustion chamber in the upstream end portion of said housing; a refractory lining disposed on and covering the inner wall of said reaction tube; a first tangential air inlet means disposed adjacent said downstream end of said housing and communicating with said annular space for introducing a first stream of air into said annular space; a second tangential air inlet means of smaller diameter than said first air inlet means, disposed adjacent said upstream end of said housing and communicating with said combustion chamber for introducing a second stream of air into said combustion chamber; a gas burner means extending through said closure member into said combustion chamber in substantial axial alignment with said reaction tube; and a hydrocarbon inlet means concentrically mounted within said gas burner means and extending into said combustion chamber beyond said burner means.

3. A carbon black furnace, comprising: an elongated generally cylindrical housing having an upstream end portion and a downstream end portion, said downstream end portion being of larger diameter than said upstream portion and comprising from about 0.1 to about 0.4 of the total length of said housing; a generally cylindrical sleeve, of smaller diameter than, and attached to the upstream end of said housing; a closure member closing the upstream end of said sleeve; an elongated generally cylindrical reaction tube having an upstream end and a downstream end, of smaller diameter than said upstream end portion of said housing, and concentrically mounted within said housing to provide an annular space between the outer wall of said reaction tube and the inner wall of said housing; an annular closure plate closing the downstream end of said annular space; said upstream end of said reaction tube being spaced apart longitudinally from said upstream end of said housing to provide a combustion chamber in the upstream end portion of said housing, said combustion chamber comprising from about 0.15 to about 0.35 of the total length of said housing; a refractory lining disposed on and covering the inner wall of said reaction tube; a first tangential air inlet means disposed in said downstream end portion of said housing and communicating with said annular space for introducing a first stream of air into said annular space; a second tangential air inlet means, of smaller diameter than said first air inlet means, disposed in said upstream end portion of said housing and communicating with said combustion chamber for introducing a second stream of air into said combustion chamber; at least one other tangential air inlet means disposed in said housing between said first and second air inlet means and communicating with said annular space for introducing an additional stream of air into said annular space; a gas burner means extending through said closure member into said combustion chamber in substantial axial alignment with said reaction tube; and a hydrocarbon inlet means concentrically mounted within said gas burner means and extending into said combustion chamber beyond said burner means.

4. A carbon black furnace, comprising: an elongated generally cylindrical housing having an upstream end and a downstream end; a closure member closing the upstream end of said housing; an elongated generally cylindrical reaction tube having an upstream end and a downstream end, of smaller diameter than said housing, and concentrically mounted within said housing to provide an annular space between the outer wall of said reaction tube and the inner wall of said housing; an annular closure plate closing the downstream end of said annular space; a refractory restricted Venturi choke having a throat diameter of from 20 to 80 percent of, and a length of from 1 to 3 times the diameter of said reaction tube; said upstream end of said reaction tube being spaced apart longitudinally from said upstream end of said housing to provide a combustion chamber in the upstream end portion of said housing; a refractory lining disposed on and covering the inner wall of said reaction tube; a first tangential air inlet means disposed adjacent said downstream end of said housing and communicating with said annular space for introducing a first stream of air into said annular space; a second tangential air inlet means, of smaller diameter than said first air inlet means, disposed adjacent said upstream end of said housing and communicating with said combustion chamber for introducing a second stream of air into said combustion chamber; a gas burner means extending through said closure member into said combustion chamber in substantial axial alignment with said reaction tube; and a hydrocarbon inlet means concentrically mounted within said gas burner means and extending into said combustion chamber beyond said burner means.

5. A carbon black furnace, comprising: an elongated generally cylindrical housing having an upstream end portion and a downstream end portion, said downstream end portion being of larger diameter than said upstream portion and comprising from about 0.1 to about 0.4 of the total length of said housing; a generally cylindrical sleeve, of smaller diameter than, and attached to the upstream end of said housing; a closure member closing the upstream end of said sleeve; an elongated generally cylindrical reaction tube having an upstream end and a downstream end, of smaller diameter than said upstream end portion of said housing, and concentrically mounted within said housing to provide an annular space between the outer wall of said reaction tube and the inner wall of said housing; an annular closure plate closing the downstream end of said annular space; a refractory restricted Venturi choke having a throat diameter of from 20 to 50 percent of, and a length of from 1.5 to 3 times the diameter of said reaction tube; said upstream end of said reaction tube being spaced apart longitudinally from said upstream end of said housing to provide a combustion chamber in the upstream end portion of said housing, said combustion chamber comprising from about 0.15 to about 0.35 of the total length of said housing; a refractory lining disposed on and covering the inner wall of said reaction tube; a first tangential air inlet means disposed in said downstream end portion of said housing and communicating with said annular space for introducing a first stream of air into said annular space; a second tangential air inlet means, of smaller diameter than said first air inlet means, disposed in said upstream end portion of said housing and communicating with said combustion chamber for introducing a second stream of air into said combustion chamber; at least one other tangential air inlet means disposed in said housing between said first and second air inlet means and communicating with said annular space for introducing an additional stream of air into said annular space; a gas burner means extending through said closure member into said combustion chamber in substantial axial alignment with said reaction tube; and a hydrocarbon inlet means concentrically mounted within said gas burner means and extending into said combustion chamber beyond said burner means.

6. A method for producing carbon black from a hydrocarbon feedstock, said carbon black having higher structure characteristics than the carbon black normally produced from said feedstock, which method comprises: preheating a first stream of air by passing same through an annular space in indirect heat exchange with and in a direction generally countercurrent to the flow of a reaction mixture being passed through a generally cylindrical reaction zone surrounded by said annular space; introducing said preheated air into a generally cylindrical combustion zone disposed upstream of and in open communication with said reaction zone; introducing a second stream of air tangentially into said combustion zone and into admixture with said first stream of air, said second stream of air being introduced in an amount within the range of from 25 to 67 volume percent of the total of said first stream of air and said second stream of air; introducing a stream of fuel gas into said combustion zone to establish a rotating mixture of fuel gas and air in said combustion zone; igniting said mixture and passing the resulting rotating hot combustion gases into the upstream end of said reaction zone; introducing a hydrocarbon feedstock into the upstream end of said reaction zone; in said reaction zone, forming said reaction mixture by partially burning said feedstock under carbon black producing conditions to produce said carbon black; and recovering said carbon black from the reaction mixture effluent from said reaction zone.

7. A method for producing carbon black from a hydrocarbon feedstock, said carbon black having higher structure characteristics than the carbon black normally produced from said feedstock, which method comprises: preheating a first stream of air by passing same through an annular space in indirect heat exchange with and in a direction generally countercurrent to the flow of a reaction mixture being passed through an elongated generally cylindrical reaction zone surrounded by said annular space; introducing said preheated air into a generally cylindrical combustion zone having an effective diameter which is at least twice, and a length which is less than ½, that of said reaction zone, and disposed axially upstream of and in open communication with said reaction zone; introducing a second stream of air tangentially into said combustion zone and into admixture with said first stream of air, said second stream of air being introduced in an amount within the range of from 25 to 67 volume percent of the total of said first stream of air and said second stream of air; introducing a stream of fuel gas into said combustion zone to establish a rotating mixture of fuel gas and air in said combustion zone; igniting said mixture and passing the resulting rotating hot combustion gases into the upstream end of said reaction zone; introducing a hydrocarbon feedstock into said burning mixture and passing same along with said burning mixture into the upstream end of said reaction zone through a restricted Venturi choke having a throat diameter of from 20 to 80 percent of, and a length of from 1 to 3 times, the diameter of said reaction zone; in said reaction zone, forming said reaction mixture by partially burning said feedstock under carbon black producing conditions to produce said carbon black; and recovering said carbon black from the reaction mixture effluent from said reaction zone.

8. A process according to claim 6 wherein said carbon black product has a desired predetermined increase in structure characteristics and the amount of said increase in structure characteristics is controlled by adjusting the velocity of said second stream of air.

References Cited

UNITED STATES PATENTS

| 2,924,512 | 2/1960 | Webster et al. | 23—259.5 |
| 2,976,128 | 3/1961 | Latham et al. | 23—259.5 |
| 3,087,796 | 4/1963 | Latham et al. | 23—259.5 |
| 3,256,065 | 6/1966 | Latham | 23—259.5 |
| 3,256,066 | 6/1966 | Higgins | 23—259.5 |

EDWARD J. MEROS, *Primary Examiner.*